United States Patent [19]

Oldham

[11] 4,348,076

[45] Sep. 7, 1982

[54] FIBRE-OPTIC CABLE JOINTS

[75] Inventor: Ronald C. Oldham, Chandlers Ford, England

[73] Assignee: International Standard Electric Corporation, New York, N.Y.

[21] Appl. No.: 70,580

[22] Filed: Aug. 29, 1979

[30] Foreign Application Priority Data

Oct. 3, 1978 [GB] United Kingdom ............... 39147/78

[51] Int. Cl.³ .............................................. G02B 7/26
[52] U.S. Cl. ............................... 350/96.22; 350/96.21
[58] Field of Search ......................... 350/96.21, 96.22; 174/89

[56] References Cited

U.S. PATENT DOCUMENTS 2,449,983  9/1948  Devol .
2,858,358 10/1958  Hawke .................. 174/89
3,077,515  2/1963  Diver ..................... 178/89
3,171,707  3/1965  Powell .
3,373,243  3/1968  Janowiak et al. .
3,413,407 11/1968  Potter .................... 174/89
4,107,451  8/1978  Smith et al. .

4,183,616  1/1980  Benoit et al. ................. 350/96.21 X

FOREIGN PATENT DOCUMENTS 2628747  1/1977  Fed. Rep. of Germany ... 350/96.21
 573661 11/1945  United Kingdom .
1499510  1/1978  United Kingdom .

Primary Examiner—Vincent P. McGraw
Assistant Examiner—Rodney B. Bovernick
Attorney, Agent, or Firm—John T. O'Halloran

[57] ABSTRACT

Ferrule and method of jointing two fibre-optic communications cables having optical fibres arranged in a tubular strength member, employing a tubular ferrule body, which body comprises one or more longitudinally-split portions, to transmit the strain between the strength members of the two cables. The strength member at each cable end is provided with a clamping arrangement; the optical fibres of the two cables are jointed; in one embodiment a split ferrule body is assembled over the fibres and joints, and a compression nut screwed onto each end of the ferrule body to clamp the body portions together and to the strength member clamping arrangements.

13 Claims, 4 Drawing Figures

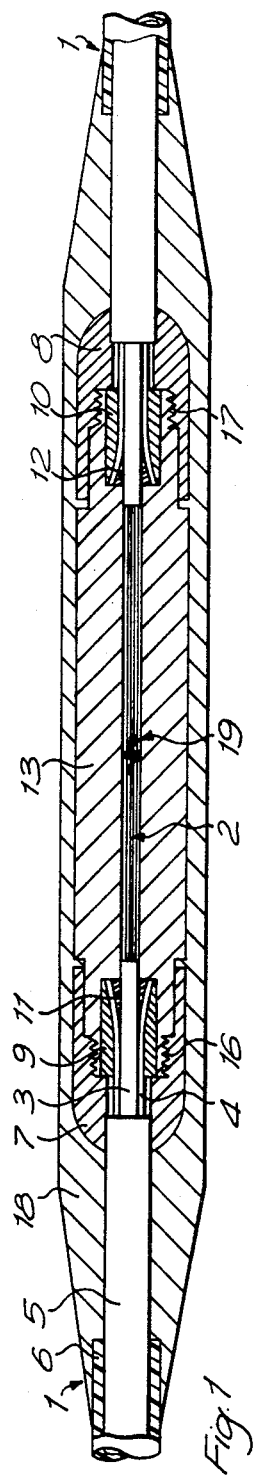
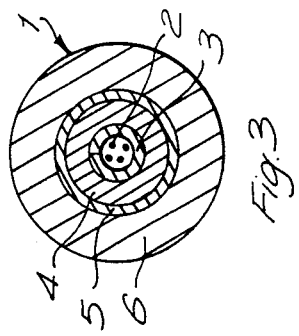
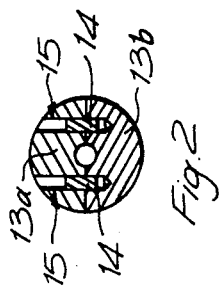

FIBRE-OPTIC CABLE JOINTS

BACKGROUND OF THE INVENTION

This invention relates to joints between fibre-optic communications cables and in particular to methods of, and ferrules for use in, making such joints.

Fibre-optic communications cables generally include some form of strength member to carry the strains involved in installing the cables in ducts or laying them underwater, since the fibres are not capable of bearing such strains themselves. When two fibre-optic cables are jointed there must, therefore, be means provided at the joint to transfer the strain from one cable strength member to the other cable strength member.

In the case of fibre-optic cables which are used for submarine purposes, it is necessary that the cable also includes metallic conductors for use in supplying electrical power to regenerators, which must be employed when the optical fibres are used for relatively long distances. When jointing such cables means must also be provided for jointing the metallic conductors. One such form of fibre-optic cable is disclosed in U.S. Pat. No. 4,239,336 in which individually clad optical fibres are arranged in an aluminum tube which acts as protection in the form of a C-section in which the fibres are laid, the split being sealed by soldering or welding, thereby forming a pressure-resisting protective tube around the optical fibres. The tube is surrounded by a cylindrical strength member formed, for example, by one or more layers of high tensile steel wires or synthetic fibres, and this member is surrounded by a layer of copper tape, which acts as a conductor for the supply of power to the regenerator, which tape is in turn surrounded by a layer of dielectric, for example polyethylene.

One method, involving the use of ferrules, for jointing two fibre-optic communications cables is described in my co-pending U.S. patent application Ser. No. 050,377, filed June 20, 1979, now U.S. Pat. No. 4,252,405.

This method involves terminating each cable end into a respective ferrule sleeve portion, jointing the optical fibres of the cables, and securing the ferrule sleeve portions together. The joints between the optical fibres are arranged in a cavity within the ferrule sleeve portions together with a folded up length of the optical fibres.

SUMMARY OF THE INVENTION

According to one aspect of the present invention there is provided a method of jointing two fibre-optic communications cables each having optical fibres arranged in a respective tubular strength member, including the steps of providing each strength member with a respective first clamping arrangement, jointing the optical fibres of the two cables, arranging a tubular ferrule body over the optical fibres and joints therebetween, which body comprises one or more longitudinally-split portions, providing a respective further clamping arrangement adjacent each end of the tubular ferrule body and tightening the further clamping arrangements whereby to clamp the split elements together and to the first clamping arrangements, and cause the first clamping arrangements to securely grip the respective strength members.

According to a further aspect of the present invention there is provided a ferrule for use in jointing two fibres arranged in a respective tubular strength member, comprising respective means whereby to grip the end of the strength member at each cable end, a tubular ferrule body comprising one or more longitudinally-split portions and means associated with each end of the ferrule body for clamping the portions of the ferrule body together and to the strength member gripping means such as to transfer strain between the strength members of the two cables in use thereof.

BRIEF DESCRIPTION OF THE DRAWINGS

Embodiments of the invention will now be described with reference to the accompanying drawings, in which:

FIG. 1 shows, partially in section, a joint between two fibre-optic communications cables made by a method and employing a ferrule assembly according to one embodiment of the present invention;

FIG. 2 shows, a transverse section through the split body of the ferrule assembly of FIG. 1;

FIG. 3 shows, on an enlarged scale, a transverse section through a fibre-optic cable of the type jointed in FIGS. 1 and 3.

DETAILED DESCRIPTION OF THE PREFERRED EMBODIMENTS

Figure 4:
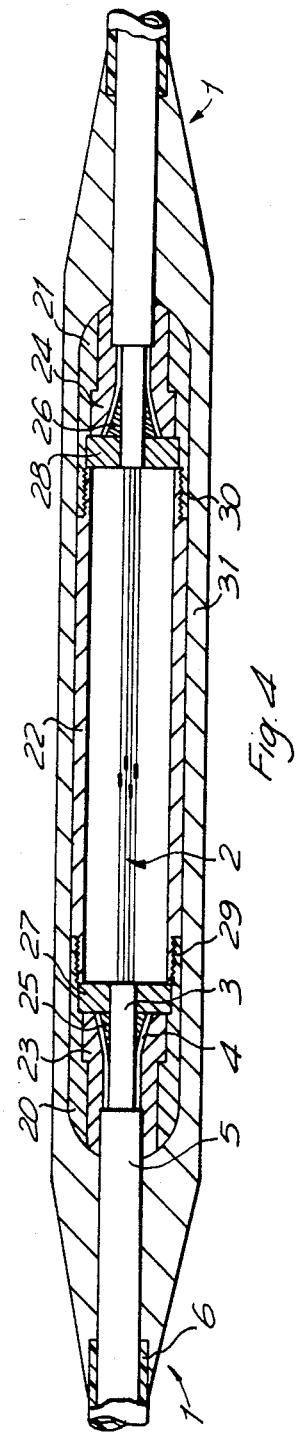
FIG. 4 shows, partially in section, a joint between two fibre-optic communications cables made by a method and employing a ferrule assembly according to another embodiment of the present invention.

The fibre-optic communications cables 1 to be jointed are shown in FIG. 3 as having four suitably clad optical fibres 2 arranged in a protective aluminum pressure-resistant tube 3 which is surrounded by a strength member 4 comprised, for example, of one or more layers of stranded high tensile steel wires laid up over tube 3, or alternatively windings of a tape or strands of a synthetic insulating material such as polyethyleneterepthalate gycol arranged over tube 3. A tubular copper conductor 5 is arranged over the strength member 4, and a sheath of plastics insulating material 6, such as polyethylene, is extruded over the conductor 5.

To join two fibre-optic cables 1 their free ends must each first be prepared by removing the sheath 6 for a predetermined distance to expose the copper conductor 5. An end portion of each exposed copper conductor 5 is then removed to expose the strength member 4, and an end portion of each strength member 4 is removed to expose the aluminium tube 3. An end portion of each of the tubes 3 is removed to expose the optical fibres 2. The lengths of the fibres which are exposed must be sufficient to permit subsequent jointing and must be compatible with the length of the tubular ferrule body, as will be further described hereinafter.

In accordance with the embodiment shown in FIGS. 1 and 2 respective compression nut 7 or 8 is slipped over each cable end onto the copper conductor 5 during or after preparation of the cable end. A respective sleeve element 9 or 10, whose internal diameter over a region adjacent one end is a sliding fit over strength member 4, and which increases in a tapered manner towards the other end, is slipped over the cable end after the compression nut 7 or 8, respectively. A respective tapered wedge element 11 or 12, comprising a cone with an axial bore, is positioned on each tube 3 as shown after splaying out of the strands or tapes of the strength member 4. The strands or tapes are then relaid and a grip-improving medium may be forced between the strands or tapes. This medium may for example comprise carborundum or aluminium oxide grit in suspension in methylated spirit or epoxy resin.

The optical fibres of the two cables are then jointed in a conventional manner, for example by use of fusion joints 19. A bored ferrule body 13 which is longitudinally split into two portions 13a and 13b (FIG. 2) is used to cover the optical fibres and joints. The adjacent faces of the ferrule body portions 13a and 13b are ground to ensure good contact therebetween, and dowels 14 and corresponding bores 15 are provided for accurate location of the two portions together and to prevent relative movement therebetween prior to clamping, as is hereinafter described.

The reduced external diameter end portions of the body 13 are externally threaded as shown, and the internal bore has a larger diameter portion adjacent each end. The sleeve elements 9 and 10 are a slide fit in the larger diameter bore portions. The compression nuts 7 and 8 have a stepped internal bore which increases in diameter from the cable to the joint as shown, and have an internal thread co-operable with the external thread on the ends of the body 13. This threading is shown schematically at 16 and 17. The length of the smaller diameter bore in the body 13 is greater than the exposed and jointed lengths of the optical fibres so that it extends over the exposed ends of the pressure tube 3 as shown in FIG. 1, which are of a comparable external diameter.

With the body 13 is place the compression nuts 7 and 8 are screwed onto the ends thereof to clamp the portions 13a and 13b together, while at the same time forcing the sleeve elements 9 and 10 into co-operation with the tapered wedge elements 11 or 12 respectively to grip the corresponding strength member 4 therebetween. The threads of the compression nuts 7 and 8 may be locked by means for example of a suitable locking compound such as "Locktite A 602".

The ferrule assembly comprising nuts 7 and 8 and split body 13 then has a moulding 18 of plastics insulation material compatible with the cable sheath material formed thereon to reconstitute the insulating sheath between the two cables 1. If the ferrule assembly nuts 7 and 8 and body 13 are made of a suitable electrically conductive material, for example EN16T Steel, and the compression nuts are in good electrical contact with the copper conductors 5, then even if the strain member is made of an electrically insulating material the ferrule assembly will provide continuity of the copper conductor between the two cables, as well as jointing the strength members 4 of the cables and mechanically and electrically jointing the pressure tubes 3 protecting the optical fibres.

The method of jointing two prepared fibre-optic cables 1 according to the alternative embodiment of FIG. 4 will now be described. A respective compression nut 20 or 21 is slipped over each cable end onto the copper conductor 5 during or after preparation of the cable end, and a tubular ferrule sleeve 22 is slipped over one cable end. A respective sleeve element 23 or 24, whose internal diameter over a region adjacent one end is a sliding fit over strength member 4, and which increases in a tapered manner towards the other end is slipped over the cable end after the compression nut 20 or 21 respectively. A respective tapered wedge element 25 or 26, comprising a cone with an axial bore, is positioned on each tube 3 as shown after splaying out of the strands or tapes of the strength member 4. The strands or tapes are then relaid and a grip-improving medium may be forced between the strands or tapes, as described for the embodiment of FIGS. 1 and 2.

The optical fibre of the two cables are then jointed in a conventional manner. The tubular ferrule sleeve 22 is then pulled up into position over the jointed optical fibres and the spaces between the ends of the sleeve 22 and the respective compression nuts 20 and 21 filled by means of longitudinally split collars 27 and 28 respectively, arranged on the pressure tubes 3 of the cables. The ends of the tubular ferrule sleeve 22 are externally threaded. The compression nuts 20 and 21 have a stepped internal bore which matches the external stepped shape of the tapered sleeves 23 and 24 together with the external thread on the ends of the sleeve 22. This threading is shown schematically at 29 and 30. Screwing of the compression nuts 20 and 21 onto the ends of the sleeve 22 serves to clamp the respective portions of the collars 27 and 28 together whilst at the same time forcing the sleeve elements 23 and 24 into co-operation with the tapered wedge elements 25 or 26 respectively to grip (compress) the corresponding strength member 4 therebetween. The collars 27 and 28, which are captured between their respective compression nuts and ends of the sleeve 22, act as stops against which the tapered sleeves and wedges are forced whereby to provide the gripping action.

The ferrule assembly comprising nuts 20 and 21 sleeve 22, and sleeves 23 and 24 then has a moulding 31 of plastics material compatible with the cable sheath material formed therein to reconstitute the insulating sheath between the two cables 1. If the ferrule assembly nuts 20 and 21, sleeve 22, and tapered sleeves 23 and 24 are made of a suitable electrically conductive material, for example EN16T Steel, and the sleeves 23 and 24 are in good electrical contact with the copper conductors, then even if the strain member is made of an electrically insulating material the ferrule assembly of FIG. 4 will provide continuity of the copper conductor between the two cables, as well as jointing the strength members 4 of the cables and mechanically and electrically jointing the pressure tubes 3 protecting the optical fibres.

In the embodiment of FIGS. 1 and 2 the tubular ferrule body 13 is comprised solely of the longitudinally split tube with portions 13a and 13b. In the embodiment of FIG. 4 the tubular ferrule body comprises a tubular ferrule sleeve 22, which is not split, and two collars 27 and 28 both of which are longitudinally split.

Thus the ferrule assemblies of the present invention provide methods of jointing the optical fibres of a cable without having to fold the fibres in order to arrange them in a cavity of a ferrule.

Whereas this invention has been described with respect to specific embodiments thereof, it will be understood that various changes and modifications will be suggested to one skilled in the art, and it is intended to encompass such searches and modifications as are within the scope of the appended claims.

What is claimed is:

1. A method of jointing two fibre-optic communications cables each having optical fibres arranged in a respective tubular strength member, including the steps of providing each strength member with a respective first clamping arrangement, jointing the optical fibres of the two cables, arranging a tubular ferrule body over the optical fibres and joints therebetween, which body comprises one or more longitudinally-split portions, providing a respective further clamping arrangement adjacent each end of the tubular ferrule body and tightening the further clamping arrangements whereby to clamp the split elements together and to the first clamping arrangements, and cause the first clamping arrangements to securely grip the respective strength members.

2. A method as claimed in claim 1, wherein the cables each have a sheath of a plastics insulating material, further including the step of moulding plastics material over the ferrule body and the further clamping arrangements to extend between the sheaths of the cables.

3. A method as claimed in claim 1 or 2, wherein the optical fibres are arranged within a pressure resisting tube positioned in the tubular strength member and the tubular ferrule body comprises a multi-part longitudinally-split tube, wherein the step of providing a respective further clamping arrangement comprises sliding a respective compression nut over an exposed portion of the strength member of each cable, wherein the step of providing each strength member with a respective first clamping arrangement comprises sliding a respective internally tapered sleeve element over each exposed strength member, after the respective compression nut, and arranging a respective tapered wedge element on the pressure tube under each exposed strength member, and wherein when the compression nuts are screwed onto respective threaded portions of the split tube the strength members are gripped between the respective wedge and tapered sleeve elements, the parts of the split tube are clamped together and the and the pressure tubes of the two cables are joined.

4. A method as claimed in claim 3, wherein the strength member of each cable is arranged in a respective tubular electrical conductor and the compression nuts and split tube are of an electrically conductive material, further including the step of making electrical contact between the compression nuts and the tubular electrical conductors whereby to provide electrical continuity between the tubular electrical conductors of the two cables.

5. A method as claimed in claim 1 or 2, wherein the optical fibres are arranged within a pressure resisting tube positioned in the tubular strength member and the tubular ferrule body comprises a ferrule sleeve and a respective longitudinally-split collar associated with each end thereof, wherein the step of providing a respective further clamping arrangement comprises sliding a respective compression nut over an exposed portion of the strength member of each cable, wherein the step of providing each strength member with a respective first clamping arrangement comprises sliding a respective internally tapered sleeve element over each exposed strength member, after the respective compression nut, and arranging a respective tapered wedge element on the pressure tube under each exposed strength member, and wherein when the compression nuts are screwed onto respective threaded portions of the ferrule sleeve the respective split collars are gripped therebetween, the strength members are gripped between the respective wedge and tapered sleeve elements and the pressure tubes of the two cables are joined.

6. A method as claimed in claim 5, wherein the strength member cable is arranged in a respective tubular electrical conductor and the tapered sleeve elements, the compression nuts and the ferrule sleeve of an electrically conductive material, further including the step of making electrical contact between the tapered sleeve elements and the tubular electrical conductors whereby to provide electrical continuity between the tubular electrical conductors of the two cables.

7. A ferrule for use in joining two fibres arranged in a respective tubular strength member, comprising respective means whereby to grip the end of the strength member at each cable end, a tubular ferrule body comprising one or more longitudinally-split portions and means associated with each end of the ferrule body for clamping the portions of the ferrule body together and to the strength member, gripping means such as to transfer strain between the strength members of the two cables in use thereof.

8. A ferrule as claimed in claim 7, wherein the tubular ferrule body comprises a multi-part longitudinally-split tube, the strength member gripping means comprise respective co-operating tapered wedges and internally tapered sleeves arranged within end portions of the bore of the ferrule body, and wherein the means associated with the ends of the ferrule body each comprise a compression nut having an internal screw thread co-operable with an external screw thread of the ferrule body.

9. A ferrule as claimed in claim 8 for use with fibre-optic communications cables including a pressure-resistant tube surrounding the optical fibres and arranged in the tubular strength member, wherein the internal bore of the tubular ferrule body between the end portions is of a diameter equal to the external diameter of the pressure resistance tubes, and the free ends of the respective pressure-resistance tubes extend into the entrances to the bore.

10. A ferrule as claimed in claim 7, wherein the tubular ferrule body comprises a ferrule sleeve and a respective longitudinally-split collar associated with each end thereof, wherein the means associated with the ends of the ferrule body each comprise a compression nut having an internal screw thread co-operable with an external screw thread of the ferrule sleeve, and wherein the strength member gripping means comprise respective co-operating tapered wedges and internally tapered sleeves arranged within the compression nuts and abutting a respective split collar held captive between the associated compression nut and ferrule sleeve end.

11. A ferrule as claimed in claim 10 for use with fibre-optic communications cables including a pressure-resistant tube surrounding the optical fibres and arranged in the tubular strength member, wherein the internal bore of the split collars is of a diameter comparable with the external diameter of the pressure-resistant tubes, and the free ends of the respective pressure-resistant tubes extend into the bores of the collars.

12. Two fibre-optic communications cables jointed by a method as claimed in claim 1.

13. Two fibre-optic communications cables joined by a ferrule as claimed in claim 7.

* * * * *